April 18, 1961 R. E. LINDEMANN 2,980,894
PLURAL RANGE INDICATING INSTRUMENTS
Filed Dec. 6, 1956 3 Sheets-Sheet 1

INVENTOR
ROBERT E. LINDEMANN.
BY
Berry & Crews
ATTORNEYS.

April 18, 1961 R. E. LINDEMANN 2,980,894
PLURAL RANGE INDICATING INSTRUMENTS
Filed Dec. 6, 1956 3 Sheets-Sheet 2

INVENTOR
ROBERT E. LINDEMANN.
BY Berry Brews
ATTORNEYS.

United States Patent Office 2,980,894
Patented Apr. 18, 1961

2,980,894
PLURAL RANGE INDICATING INSTRUMENTS
Robert E. Lindemann, North Plainfield, N.J., assignor to David M. Potter, Warren Township, N.J.
Filed Dec. 6, 1956, Ser. No. 626,636
9 Claims. (Cl. 340—187)

This invention relates to indicating instruments adapted for indicating continuously the current state of a condition or rate which may vary over a wide range. The invention may be applied to the indication of any condition which is capable of producing a D.C. signal voltage proportional to the rate or intensity of the condition which it is desired to measure and indicate.

A typical measuring device in connection with which the invention may be utilized is the Potter flowmeter. This device includes as a primary sensor a vaned rotor which is mounted in a conduit of known diameter and which, throughout the major portion of its range, turns at a rotary velocity proportional to the volumetric rate of flow. This sensor includes a permanent magnet through which an alternating signal current is generated in a signal circuit, the frequency generated being proportional to the rate of rotation of the sensor and therefore proportional to the rate of flow. The A.C. signal is first amplified and then applied in a frequency converter to control the generating of D.C. impulses of constant amplitude at the frequency of the A.C. signal current. Since these impulses are all of the same amplitude regardless of frequency, the average D.C. voltage is proportional to the frequency of the A.C. signal, i.e., to the rate of rotation of the sensor and to the rate of volumetric flow. The D.C. voltage may be modified in accordance with the known specific gravity of the liquid whose flow is being measured, to make the D.C. signal voltage a linear function of the rate of delivery of the liquid measured in pounds per hour.

The resulting D.C. signal voltage is balanced through a potentiometer against a reference voltage which bears a fixed ratio to the D.C. source from which the D.C. signal energy is derived. Any unbalance of voltages results in a flow of current whose direction and magnitude depend upon the direction and amount of unbalance. This current is converted to 60 cycle A.C. current, is amplified, and is delivered to one of two crossed windings of a balancing induction motor. The direction of unbalance controls the direction of rotation of the motor, which always drives the potentiometer in the appropriate direction to restore balance. A scale bearing dial is commonly connected to be driven by the balancing motor shaft in proportion to the rotation thereof, the gearing being such that the scale is driven through somewhat less than a complete revolution in the traverse of the potentiometer through its full range.

An instrument of the kind described is reliable and dependable. It has the great merit that throughout a very large portion of its total operating range the travel of the scale bears a linear relation to the volumetric rate of delivery of the liquid. By introducing a specific gravity factor the rate may be indicated in terms of mass rate of flow. Either rate will be correctly indicated over a a wide range with an error of not more than a small fraction of one percent.

The instrument, however, is subject to two drawbacks.

(1) For a space approximating the first one-eighth of the range from zero to the maximum capacity of a sensor the measurements are not only non-linear but they are variable and undependable. It is an important object of the present invention to provide a plural range instrument in which the portion of the range which is not dependably readable may be reduced to a much smaller fraction of the highest available value than is possible when the present invention is not utilized.

(2) For instruments which are designed to measure up to large rates of flow a single scale is necessarily graduated in such coarse units as to be not sufficiently precise in the lower portion of the range. In the higher region the divisions have a practical degree of fineness because the graduations are sufficiently fine, when applied to a large rate of flow, to give a reading within very small percentage limits of error. In the lower portions of the range, however, a desired degree of accuracy is not afforded. It is accordingly a further important object of the invention to provide a plurality of successive range scales which may be disposed side by side in the same sector of a rotary scale carrier, together with means for causing the scale carrier to be automatically advanced through one range after the other, and to be automatically returned at the beginning of each new range either to the point of beginning or to such value as the rate of flow may have attained, together with means for automatically indicating the scale which is to be referred to at any given time.

It is a further object to provide a multi-scale indicating instrument capable of being switched from one sensor or group of sensors to another sensor or group of sensors, and capable, when so switched, of being caused to indicate promptly the proper position on the appropriate scale without necessarily traversing each scale successively from bottom to top. In accordance with one feature of the invention, if the correct reading is at an intermediate point on the second scale when the indicating instrument is switched in, the scale carrier will immediately move forward through the first range, the second scale will then be indicated as effective, and the scale carrier will be returned directly to indicate the point on the second scale which should be indicated. If, in the same situation, the correct indication is at a point in the third range, the scale carrier will turn completely through the first range, the second scale will be indicated, the scale carrier will move backward for just an instant but will then return to the forward limit, the third range will be indicated and the scale carrier will move backward, if necessary, until the correct point on the third scale is indicated.

Other objects and advantages will hereinafter appear.
In the drawing forming part of this specification.

Figures 1, 3:
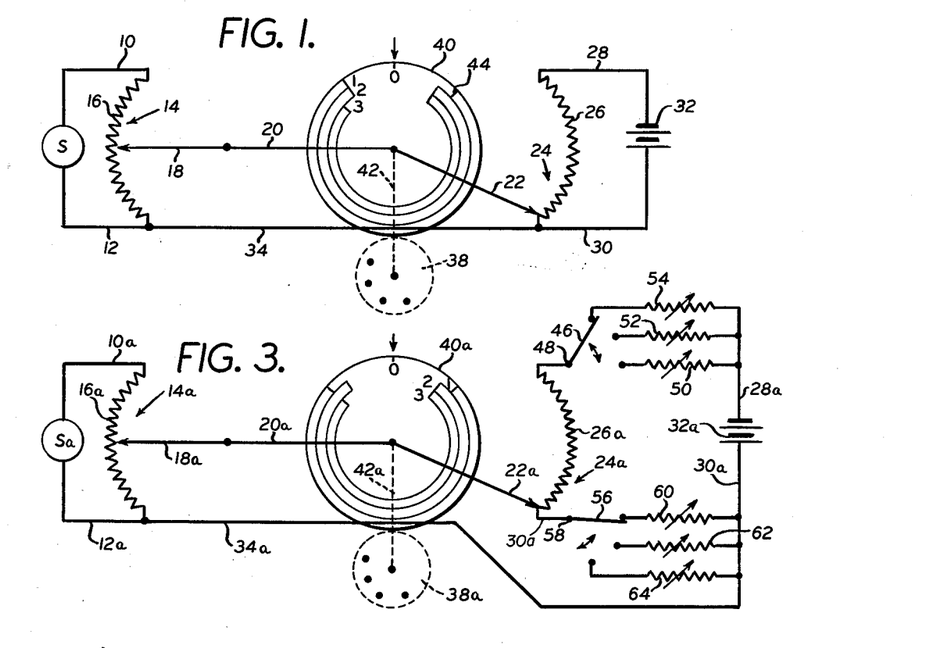
Figure 1 is a diagrammatic view of a simplified form of instrument designed to illustrate certain principles of the invention.
Figure 3 is a view similar to Figure 1 of a second simplified instrument illustrating further features of the invention.

Before describing the illustrative commercial form of the invention reference will first be had to the instruments of Figures 1 and 3 which show more or less hypothetical instruments introduced chiefly for the purpose of affording a simple basis for discussion of certain principles of the invention.

In Figure 1 an instrument is illustrated in which a signal device S measures a condition to be indicated, such as rate of flow, and produces a D.C. voltage which, throughout the major portion of its operative range, is proportional to the rate of flow. It may be assumed, however, that the device S is unreliable throughout the first eighth of its operative range. The device S has its opposite terminals connected through conductors 10 and 12 to opposite ends of a manually settable potentiometer 14 which comprises a resistor 16 and a slide 18. The slide 18 is connected through a conductor 20 with a slide 22 of a second potentiometer 24, the slide wire of which is indicated at 26. Opposite ends of the slide wire 26 are connected through conductors 28 and 30 to a source 32 of fixed D.C. reference voltage, which is represented in the illustration as a battery. Conductors 12 and 30 are at a common potential, being connected to one another by a conductor 34. The slide 22 is shown as driven by the shaft 42 of a balancing motor 38. The balancing motor is made responsive through conventional means (not shown in detail) to operate the slide 22 in one direction or the other to a balancing position whenever the voltage at the slide 18 from the variable source S is not balanced by the reference voltage at the slide 22 from the fixed source 32. A dial 40 driven by the shaft 42 of balancing motor 38 may be used in conjunction with a fixed reference mark to indicate the condition measured by the signal device S.

The instrument as thus far shown and described may be used in conjunction with the outermost scale shown on the dial 40 to indicate the total range of a signal device employing a wide range sensor capable of indicating in pounds per hour a high rate of delivery of the liquid whose flow is being measured. The total operative range of the device would be from $o$ to $i$ of the graph of Figure 2. The curve of such an instrument would be essentially a straight line $oa$, but since the device is undependable in the first eighth of its range, the scale would have to be left blank in the range corresponding to $oe$ of Figure 2, the graduations on the dial being caused to start at 44 and continue in a clockwise direction around the dial to the upper limit of the scale. By adjusting the setting of slide 18 of the potentiometer 14, the fraction of the total available signal voltage which is applied to the potentiometer and balanced against the voltage from source 32 may be varied. A setting would desirably be chosen which would place the highest point in the measuring range of the signaling device chosen at the highest point of the scale. The scale would be calibrated accordingly. The full scale, including the ungraduated portion nearest zero, would correspond to the full travel of the slide 22 from end to end of the potentiometer resistor 24. In other words, at the maximum indication the full voltage deliverable by the source 32 would be just balanced by the fraction of the maximum available signal voltage chosen for use as determined by the setting of the slide 18.

Figure 2:
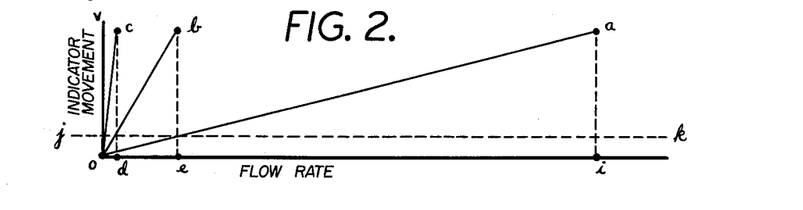
Figure 2 is a graph indicating the voltage-flow rate curves of several primary sensors and how they may be combined with one another by the instrument of Figure 1.

Alternatively, a signal device of intermediate range might be used capable of covering, with the same proportionate limits as before, the total range $oe$ of Figure 2. In this case the range $od$ would have to left blank. The scale, corresponding to the full traverse of the resistor 24 by the slide 22, can be distributed through the same part of the dial as before, simply by re-adjusting the position of the slide 18 of potentiometer 14.

Still again, a signal device of narrow range might be used capable of covering with the same proportionate limits as before the total range $od$ of Figure 2. In this case a narrow range, not designated, would have to be left blank. The curve $oc$ would be adjusted in slope as before to cause the total length of the resistor 24 to be traversed by the slide 22 and the total length of the scale to be utilized, simply by re-adjusting the position of the slide 18 of potentiometer 14. In every instance the calibrations would, of course, be appropriate to the range covered.

The scale for $oa$ would have the advantage of indicating eight times the maximum quantity of the scale for $ob$ and sixty-four times the maximum quantity of the scale for $oc$. On the other hand, the unavailable range for $oa$ starting from zero would be eight times as great as that for $ob$ and sixty-four times as great as that for $oc$. The scale for $oa$ would, moreover, be eight times as coarse as the scale for $ob$ and sixty-four times as coarse as the scale for $oc$. It is generally desirable to have a fine scale in the lower range, an intermediate scale in the intermediate range, and a coarse scale in the upper range. In this way the percentage of accuracy runs about the same for corresponding points of each scale.

If the three signal devices referred to could be combined the resulting instrument would have the advantage of scales of three different degrees of fineness with the lowest reading very much nearer to zero than when the intermediate or wide range signal device is used alone and with the maximum range extended very much farther than when the intermediate or the low range signal device is used alone.

In accordance with the present invention such a result is obtained substantially by providing a plurality, say three, signal devices having successively wider ranges, providing three scales in a common arc of the dial, automatically switching in the low range device for use in the first range, the intermediate range device for use in the second range, and the wide range device for use in the third range. At the same time provision would be made for automatically re-adjusting the potentiometer 14 each time the instrument passes from one range to another.

It is common practice in connection with a single conduit to provide parallel branches for the conduit, a different primary sensor in each branch, and quick acting solenoid valves for controlling the respective branches. The valves are all normally closed, but each one is opened when its solenoid is energized. In accordance with the present invention, the solenoids are switched automatically as the range changes.

Concurrently with the switching of the signal devices, signal lights or other scale indicators are also switched for indicating to the user of the instrument the range which is active and the scale which is to be consulted. By this arrangement the portion of the curve $oc$ lying above the line $jk$ of Figure 2 would first be indicated on the first scale, then the portion of the curve $ob$ lying above the line $jk$ of Figure 2 would be indicated on the second scale, and finally the portion of the curve $oa$ lying above the line $jk$ of Figure 2 would be indicated on the third scale.

It should be clearly understood that the arrangement outlined is susceptible of great variation. The number of signal devices may be increased far beyond three, the ranges of the signal devices need not differ so widely from one another, and the portions of the ranges of successive devices utilized may be varied in many ways.

Figure 4:
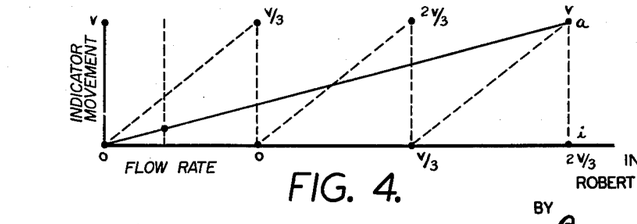
Figure 4 is a graph showing how the curve of a single sensor may be divided into successive ranges with the slope increased in order to give a more open reading than could be had on a single scale.

For the purpose of outlining another aspect of the invention reference will now be had to Figures 3 and 4. In Figure 3 the instrument diagrammatically illustrated is generally similar to the instrument of Figure 1. In so far as the parts are common, corresponding reference characters have been applied to corresponding parts with the subscript $a$ added in each instance, and no detailed description will be given.

The instrument of Figure 3 differs from that of Figure 1, however, in the fact that a choice of parallel paths having different resistance values is provided between the conductor 28a and the upper terminal of the resistor 26a of potentiometer 24a. A switch 46 connected to the terminal 48 of the resistor 26a may be set to connect in circuit a variable resistor 50, a variable resistor 52, or a variable resistor 54. For simplicity of illustration it may be presently assumed that the resistor 50 is set for zero resistance, that the resistor 52 as set has the same resistance value as the total resistance of the resistor 26a, and that the resistor 54 as set has twice the resistance value of resistor 26a.

The instrument of Figure 3 further differs from that of Figure 1 in the fact that a choice of parallel paths having different resistance values is provided between the conductor 30a and the lower end of the resistor 26a of potentiometer 24a. A switch 56 connected to terminal 58 of resistor 26a may be set to connect in circuit a variable resistor 60, a variable resistor 62, or a variable resistor 64. For simplicity of illustration it may be presently assumed that the resistor 60 is set to have zero resistance, that the resistor 62 as set has the same resistance value as the total resistance of resistor 26a, and that the resistor 64 as set has twice that resistance value.

If we consider first that the resistors 50 and 60, both set for zero resistance, are simultaneously connected in circuit the instrument of Figure 3 becomes the same as that of Figure 1. A wide range signal device capable of covering the range $oi$ of Figure 4 could be caused to utilize all of a signal scale and the full length of the resistor 26a by having its slope adjusted to that indicated by the line $oa$ of Figure 4. This would be done by adjusting the setting of the slide 18a of potentiometer 14a. With this setting of the slide 18 it is possible to divide this curve between three equal scales of the dial, each of substantially the same length as the original scale, by cutting different resistance paths into and out of circuit at the ends of successive ranges.

If, initially, the resistor 54, set to have twice the resistance value of 26a, is connected in circuit and the conductor 60 having substantially no resistance is connected in circuit, the voltage at the upper end of resistor 26a will be cut to one-third of its former voltage but the voltage at the lower end of the resistor 26a will remain at zero. If the total reference voltage which can be furnished from the fixed source is called V the present value at the upper end of resistor 26a would be $V/3$. Where formerly the signal device Sa had to produce a voltage of V for output value $oi$ at 18a in order to balance voltage V at the upper end of 26a, it is now necessary only for the signal device Sa to produce a voltage of $V/3$ at 18a in order to balance voltage $V/3$ at the upper end of 26a. The signal device will produce this voltage at 18a when output value $oi/3$ has been reached. This would represent one traverse of the resistor 26a and one traverse of the indicator range of the dial. A first scale would be provided to cover this first traverse.

If at the end of this first range resistors 52 and 62, each having a resistance value equal to that of resistor 26a, are switched into circuit, voltage from 32a at the lower end of resistor 26a now becomes $V/3$ and the voltage from 32a at the upper end of the resistor now becomes $2V/3$. The slide 22a will automatically return to the lower end of resistor 26a if the voltage value at 18a is $V/3$ and as the signal continues to increase to value $2V/3$ at 18a a second traverse of the resistor 26a and of the scale sector of the dial is effected representing the range from output value $oi/3$ to $2(oi)/3$.

If, at the end of the second range, conductor 50 and resistor 64 are cut into circuit, the former having no substantial resistance and the latter having twice the total resistance of 26a, the voltage from 32a at the lower end of the resistor 26a now becomes $2V/3$ and the voltage from 32 at the upper end of the resistor now becomes V. The slide 22a will automatically return to the lower end of the resistor 26a (assuming a voltage of $2V/3$ at 18a) and as the signal continues to increase to the value V at 18a a third traverse of the resistor 26a and of the scale sector of the dial is effected representing the range from $2(oi)/3$ to $oi$.

Figure 5:
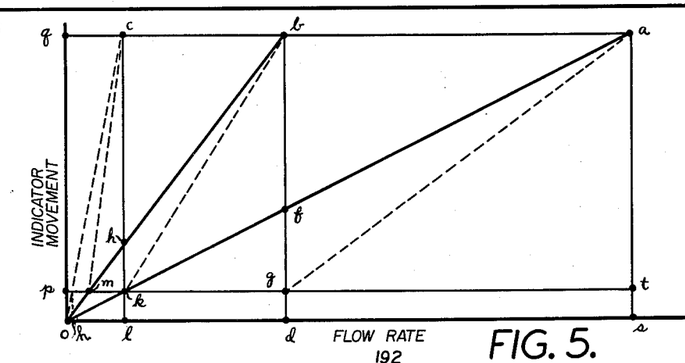
Figure 5 is another graph showing how the principles of Figures 2 and 4 may be combined in the use of the instrument of Figure 3.

Figure 5 illustrates how the principles of Figures 2 and 4 may be combined. In this showing an intermediate range signal device is employed whose complete single scale curve is represented on Figure 5 by $ob$, and a wide range signal device is employed whose complete single scale curve is represented on Figure 5 by $oa$. The output of the intermediate range signal device is further shown as divided between two substantially full range scales and the upper portion of the wide range device is utilized in connection with a third full range scale.

Through adjustment of the slide 18a, the slope of curve $ob$ may be increased to transform a curve segment $oh$ to $oc$, thereby to cause the output $ol$ to be spread over the entire resistor 26a and over the entire dial from zero to the upper limit of the usable range. Alternatively, through a combined adjustment of 18a and of the resistors in series with 26a segment $mh$ may be transformed to $mc$. The curve thus obtained may be uniformly reproduced in the first range since the settings of the resistors would remain the same, and the resistors used in that range would be brought into circuit by switching.

The curve segment $hb$ can be similarly readjusted to $kb$, and the curve segment $fa$ can be similarly readjusted to $ga$. Thus the range $ol$ may be consistently represented by $oc$, or the readable part thereof by $mc$, the range $ld$ may be consistently represented by $kb$, and the range $ds$ may be consistently represented by $ga$. The curves $mc$, $kb$ and $ga$ have corresponding lower limits in the horizontal line $pt$ and corresponding upper limits in the horizontal line $qa$. The lines $pt$ and $qa$ correspond to fixed lower and upper positions on the resistor 26a, and to fixed lower and upper positions on the dial. The several ranges may, therefore, be distributed uniformly through identical links of the resistor 26a and through identical arcs of the dial.

To recapitulate briefly, the adjustment of potentiometer 14a determines the ratio of available signal voltage at 18a to liquid flow rate and can be used only to adjust the slope of a curve. The choice of resistors at the upper and lower ends of slide wire 26a selects the reference voltages which will be maintained at the upper and lower ends of the slide wire 26a. This affects both the slope of a curve and the voltage values at the lower and upper ends of the curve. Since the curves under consideration are straight lines, the voltage values to be balanced by the signal are completely determined for every point of the slide wire 26a.

It is to be understood, of course, that the foregoing discussion is designed merely to give an insight into the elementary principles of the invention and that a wide variety of practical and advantageous effects can be provided through mechanism designed to utilize those principles as illustrated in Figure 3.

Figure 6:
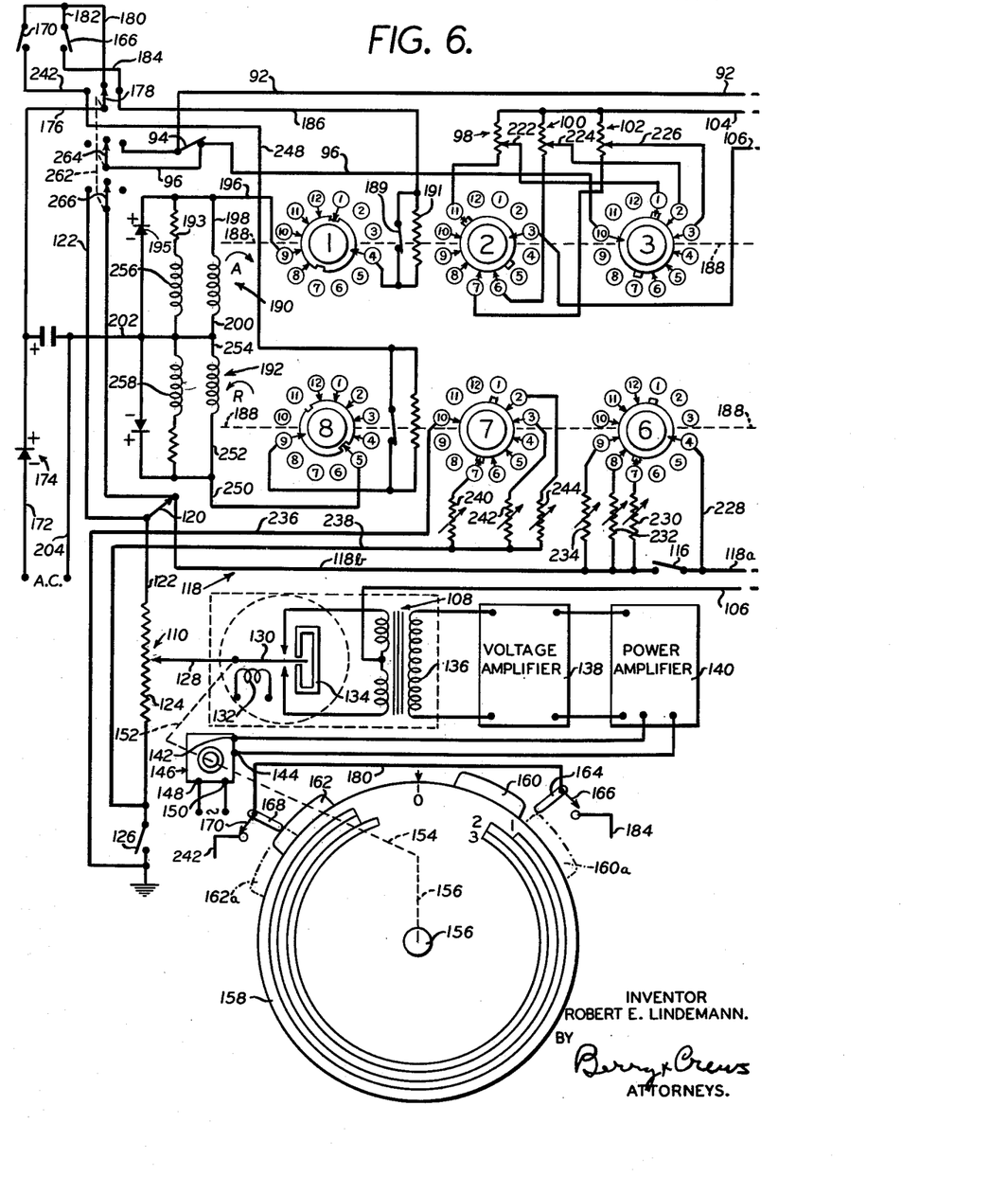
Figures 6 and 7 are complementary electrical diagrams illustrating a practical and advantageous commercial form of mechanism.
Figure 7:
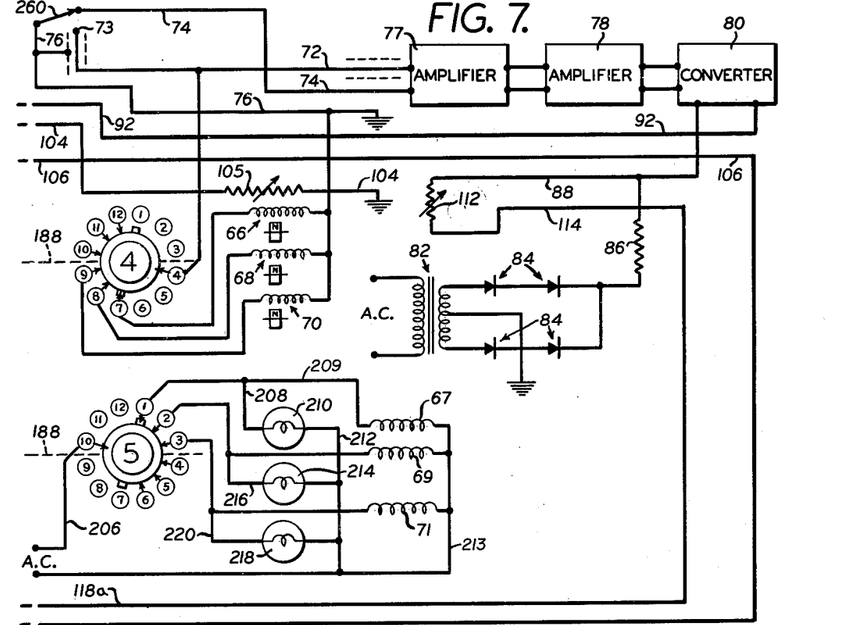
Figure 8:
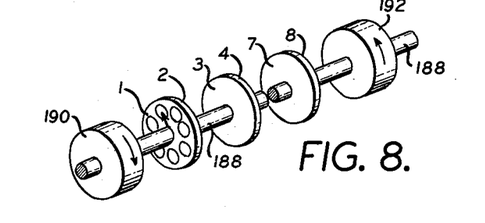
Figure 8 is a perspective, spaced out view showing the arrangement of the automatic switches and solenoids on the single control shaft.

In complementary Figures 6 and 7 disclosure is made of a practical and very versatile form of mechanism embodying features of the invention. The basic illustrative instrument, to which the improvements are shown as applied, is the well known Potter flowmeter. This instrument includes a primary sensor which generates alternating current of a frequency proportional to the rate of rotation of the sensor, and hence to the volumetric rate of flow of the liquid in which the sensor is submerged. It also includes means for deriving from current furnished by an A.C. power line and rectified, a direct current whose voltage is proportional to the frequency of the signal current, and a direct current of substantially fixed voltage. Each of these voltages is subject to variation with variation of the power source, but since the two voltages are to be balanced against one another, such variations are mutually compensating. The instrument includes means for applying a specific gravity factor to the signal voltage to provide an output voltage proportional to mass flow. It further includes a potentiometer through which the signal voltage and the relatively fixed voltage are compared, a balancing motor responsive to any out-of-balance at the potentiometer for restoring balance, and a dial bearing a signal scale for indicating the rate of flow in pounds per hour. Since all these features are well known and understood they are not shown and will not be described in complete detail. The principal emphasis will be put upon those features of improvement which characterize the present invention.

Such features include the use of a plurality of scales on a single dial one after another in connection with successive ranges, the automatic operation of signal lights or other indicators at the terminal points of the ranges to indicate which scale is to be referred to, the automatic selection of the same or a different primary sensor as the instrument passes from range to range, the automatic adjustment of signal level appropriate to the new scale as a new range is entered, and/or the automatic adjustment of the fixed voltage levels at the upper and lower ends of the balancing potentiometer for depressing or raising the range covered by the potentiometer resistor and for extending or reducing the range covered by the traverse of said resistor.

There are secondary features incidental to the above primary features, but these will be referred to and described as the detailed description proceeds.

In the illustrative mechanism of Figures 6 and 7 three primary sensors 66, 68 and 70 of narrow, intermediate and wide range, respectively, are illustrated as available for successive use. These sensors are connectable alternatively and selectively through switching means to be described, between a conductor 72 and conductors 74 and 76 (both grounded). The signal at this point is a feeble alternating current signal whose frequency is proportional to the volumetric rate of flow of the currently active sensor.

The signal is amplified in amplifiers 77 and 78, and is applied to control a converter 80. The converter 80 is supplied with electrical energy from an A.C. power line through transformer 82, full wave rectifiers 84, a resistor 86 and a conductor 88. The converter, as in the well known Potter flowmeter, produces intermittent D.C. impulses of constant amplitude, corresponding in frequency to the frequency of the A.C. signal current from the active primary sensor. A resultant average output voltage is produced on conductor 92 which is at all times directly proportional to the frequency of the original signal current. The D.C. signal current is transmitted by conductor 92 to a normally closed relay contact 94. From 94 the D.C. signal current is transmitted through a conductor 96 and through Ledex wafer switches 3 and 2 which form two of a series of eight Ledex switches all fast on a common shaft. The switches 3 and 2, by their rotary positions, select one of three range resistors or rheostats 98, 100 and 102, through selected portions of which the applied signal current may flow from signal input conductor 96 to a signal output conductor 104. The control resistors 98, 100, 102 jointly form range resistor control means for determining the output-input signal ratio throughout the respective ranges. The signal output conductor 106 is connected to selective points of the range resistors and to the midpoint of a transformer primary winding 108, the voltage at that point being balanced against a fixed voltage through a potentiometer 110. The ends of rheostats 98, 100 and 102 remote from conductor 106 are connected to ground through a variable resistor 105.

A fixed reference voltage is supplied from the conductor 88 through a rheostat 112, the rheostat serving to apply a specific gravity factor. Since it is the reference voltage which is thus modified, the modification is, in effect, the reciprocal of that which would be applied if the signal voltage were modified for this purpose. The current flows through conductor 114 to a switch 116 which may be assumed closed for the present. It passes thence through conductor 118, relay contact 120 and conductor 122 to the upper end of the slide wire 124 of potentiometer 110. The lower end of resistor 124 is connected to a switch 126 which, for the present, may be assumed to be closed. The closed switch 126 connects the lower end of the slide wire 124 to ground.

A fraction of the fixed voltage which reaches the upper end of slide wire 124 is applied to the slide 128 of the potentiometer 110. The difference of voltage between the slide 128 and the midpoint of winding 108 causes current to flow in one direction or the other along the slide 128 and a vibratory reed 130 whenever an out-of-balance condition prevails.

A winding 132, located alongside the reed 130 and energized by 60 cycle A.C. current, alternately polarizes the reed in one sense and then the other so that it is drawn toward the north and south poles of a permanent magnet 134 in alternation, there being sixty complete oscillations of the reed per second. This causes the current produced by the difference of voltage to be converted in secondary transformer winding 136 to 60 cycle alternating current, the induced voltage being in phase with the voltage through winding 132 or 180° out of phase with that voltage, depending upon the direction of unbalance of the potentiometer.

The voltage induced in 136 is amplified first in a voltage amplifier 138 and then in a power amplifier 140, being then applied between terminals 142 and 144 of a balancing induction motor 146 to one of two stator windings which are disposed at right angles to one another. 60 cycle current from the same source used for energizing winding 132 is applied between the terminals 148 and 150 to the other stator winding of the motor. The potentiometer 110 is a helical potentiometer, the slide 128 being rotatable by shaft 152 and the helical slide wire 124 remaining stationary. The output shaft 154 of balancing motor 146 is connected always to drive the potentiometer shaft 152 in a direction to restore balance. The direction of travel is determined by the direction in which the potentiometer is out of balance.

The shaft 154 of the balancing motor is also connected to drive a shaft 156 upon which a dial 158 is made fast. The illustrative dial is provided with three concentric scales designated, respectively, as 1, 2, and 3. The shaft 156 also has fast upon it switch closing cam members 160 and 162. When the member 160, travelling counterclockwise, reaches the position indicated in dotted lines at 160a it engages a control member 164 of switch 166 to close the switch 166 and thus determines one normal limit of movement of the dial. When the member 162, travelling clockwise, reaches the dotted line position indicated at 162a it engages a control member 168 of a switch 170 to close the switch 170 and thus determines the opposite normal limit of movement of the dial. The members 160 and 164 are located in one plane and the members 162 and 168 are located in another to avoid conflict. The switches 166 and 170, with associated conductors 180, 184 and 242, are shown associated with cams 160 and 162 in one part of Figure 6 and are repeated in the upper left hand corner of the circuit diagram of Figure 6.

In the full line position of Figure 6 the dial 158 is shown in the zero indicating position. This is an abnormal position, attained only during recalibration, with the dial turned clockwise beyond its normal clockwise limit of movement. This will be further explained at a subsequent point.

When the switch 166 is closed it normally energizes and actuates control mechanism for advancing the instrument to a higher range, and when the switch 170 is closed it normally energizes and actuates control mechanism for resetting the instrument to a lower range. The switches 166 and 170 are always open, except when engaged and held closed by their respective actuators 160 and 162.

As the signal strength builds up in response to an increasing rate of flow of the liquid whose flow is being measured, the member 160 is moved counterclockwise until the upper limit of the first range is reached, whereupon it closes the switch 166. This causes alternating current from the power line to flow through a conductor 172, a rectifier 174, a conductor 176, a switch 178 and conductors 180 and 182 to the switch 166. From the switch 166 the current is transmitted through conductors 184 and 186 to wafer switch No. 1 of a Ledex control unit.

The Ledex control unit consists of a single shaft 188 having wafer switches 1 to 8 fast upon it and two Ledex rotary solenoids 190 and 192, one of which ratchets the shaft step by step in one direction and the other of which ratchets the shaft step by step in the opposite direction. The solenoids are alike, save for the fact that they drive the shaft 188 in opposite directions. When the switch 166 is closed, the current is delivered through a normally closed commutator switch 189 to terminal 4 of homing wafer switch 1. The current passes thence through the notched ring to terminal 9 of wafer switch 1 and flows thence through conductors 196 and 198, the winding of solenoid 190 and conductors 200, 202 and 204, back to the line. In the present apparatus the solenoid remains in its actuated condition until the switch 166 is again opened. As the solenoid nears its fully actuated condition, the switch 189 is automatically opened, but a sufficient current flows through a resistor 191, which is connected in parallel with the switch 189, to maintain the coil of solenoid 190 energized and the solenoid fully actuated. A resistor 193 and a relay coil 256 are connected in a second path, parallel to 198, for a purpose to be explained. A diode 195 is connected in a third path between 196 and 202, the purpose being to suppress arcing. The advance of the shaft 188 a step also advances each of wafer switches 1 to 8 a step.

In the original condition, sensor 66 was connected to control the signal current through terminals 4 and 7 of wafer switch 4. The advance of wafer switch 4 disables sensor 66 and switches in the signal output of sensor 68, the terminals 4 and 8 of wafer switch 4 being now made effective. Further advance of the wafer switch 4 disables the sensor 68 and switches in the signal output of sensor 70 through terminals 4 and 9 of wafer switch 4.

The wafer switch 5 controls valve solenoids 67, 69 and 71 for rendering the sensors 66, 68 and 70 selectively effective, and range indicating lights, indicating whether the instrument is in the first, second or third range. These lights show the user of the instrument which of the three scales is to be consulted. In the initial position current from the A.C. power line flowed through a conductor 206, terminals 10 and 1 of wafer switch 5, conductor 208, light 210 and conductor 212 back to the line; also through conductor 209, solenoid 67 and conductor 213 back to the line. A single step advance of wafer switch 5 substitutes terminal 2 for terminal 1, light 214 through conductor 216 for light 210, and solenoid 69 for solenoid 67. A further advancing step of wafer switch 5 substitutes terminal 3 for terminal 2, light 218 through conductor 220 for light 214, and solenoid 71 for solenoid 69. The lights may be of distinctive colors, or may illuminate different numeral designations of the scales of the dial 158.

The wafer switches 2 and 3 adjust the slope of the curve, i.e., the ratio of effective signal voltage delivered to the potentiometer 110 to volumetric rate of flow of the active sensor.

In the first range the signal input conductor 96 is connected to slide contact 222 of range resistor 98 through terminals 10 and 1 of wafer switch 3 and signal output conductor 106 is connected to range resistor 98 through terminals 11 and 3 of wafer switch 2. In the second range signal input conductor 96 is connected to slide contact 224 of range conductor 100 through terminals 10 and 2 of wafer switch 3, and signal output conductor 106 is connected to range resistor 100 through terminals 6 and 3 of wafer switch 2. In the third range signal input conductor 96 is connected to slide contact 226 of range conductor 102 through terminals 10 and 3 of wafer switch 3 and signal output conductor 106 is connected to the slide contact 226 of range conductor 102 through terminals 7 and 3 of wafer switch 2.

The slides of range resistors, 98, 100 and 102 may be manually set in any desired relations to their associated resistors.

The wafer switches 2 and 3 affect the signal input voltage to the potentiometer 110 and may be used in a scheme of the kind graphically illustrated in Figure 2 or a combination scheme of the kind illustrated in Figure 5. The wafer switches 6 and 7 affect the voltage which is independent of the signal and may be used in a scheme like that of Figure 4 or in a combination scheme of the kind illustrated in Figure 5. If the manual switches 116 and 126 are opened, the wafer switches 6 and 7 are made effective.

With switch 116 open the conductor 118 which goes to the upper end of potentiometer resistor 124 is broken, and connection is selectively made through wafer switch 6. Current is conducted from section 118a of conductor 118 through conductor 228 to terminal 4 of water switch 6. In the first range it is delivered through terminal 7 of wafer switch 6 and variable resistor 230 to 118b, in the second range it is delivered thorugh terminal 8 of wafer switch 6 and variable resistor 232 to 118b, and in the third range it is delivered through terminal 9 of wafer switch 6 and variable resistor 234 to 118b.

With switch 126 open the connection of the lower end of slide wire 124 to ground is broken. The ground connection is made through a grounded conductor 236 which is connected to terminal 10 of wafer switch 7 and through a conductor 238 which is connected to the lower end of the slide wire 124. In the first range the ground connection is established from 238 to 236 through a variable resistor 240 and terminals 7 and 10 of wafer switch 7, in the second range it is established through a variable resistor 244 and terminals 2 and 10 of wafer switch 7, and in the third range it is established through a variable resistor 242 and terminals 3 and 10 of wafer switch 7.

In the first range wafer switch 1 stands ready to complete a circuit through its terminals 4 and 9 to rotary solenoid 190 upon closing of the switch 166 at the upper limit of the first range. At the end of the second range the circuit will again be completed through terminals 4 and 9 upon the closing of switch 166. This, however, will carry the lower notch of wafer switch 1 into alignment with the contact of terminal 9 and no advance of the shaft 188 at the upper end of the third range will be possible.

As wafer switch 8 is shown in Figure 6 the parts are in the first range. It is not desired to step the shaft 188 backward at the lower limit of the first range. It is desired, however, to step the shaft backward at the lower limit of the third range and again at the lower limit of the second range as the signal values decline. In the third range switch 8 will have been moved two steps clockwise from the position shown in Figure 6. If at that time the strength of the signal declines, causing the shaft 156 to turn backward to the lower limit of the third range, the switch actuator 162, moving clockwise, will close switch 170. Current will now flow from the line through 172, 174, 176, 178 and 180 to switch 170 and from the switch through conductors 246 and 248 to terminal 9 of wafer switch 8. Since in the third range the contact of terminal 5 of wafer switch 8 is active, the circuit is continued through conductors 250 and 252, solenoid coil 192 and conductors 254, 202 and 204 back to the line. This operates the shaft 188 backward one step, setting up all the conditions for the second range. At the lower limit of the second range the same operation will be repeated over the same circuit to turn the shaft 188 another step backward and set up the conditions for the first range. Since this returns the lower notch of wafer switch 8 to the position opposite terminal 5 of the switch, no further backward movement of the shaft 188 can be effected, as has been pointed out.

If we assume a gradual building up of flow delivery rate with the instrument in operation, the potentiometer shaft 152 will be turned by the balancing motor shaft 154 to produce a relative shifting of the slide 128 upward along the slide wire 124. At the same time the dial shaft 156 will be driven counterclockwise by the balancing motor shaft 154 until the upper limit of the first range is reached. At that point the switch 166 will be closed, and the shaft 188 will be turned one step forward, as already explained, to establish the operating conditions for the second range. This immediately throws the potentiometer 110 out of balance. Assuming that the rate of flow is such that the point of balance lies at an intermediate point of the second range, the shafts 154, 152 and 156 will now be automatically operated backward until the point of balance is reached, at which point the second scale of the dial will correctly indicate the rate of liquid flow.

The retrograde movement of the shaft 156 permits the switch 166 to re-open, and to condition the solenoid 190 for a further operation when the switch 166 is next closed.

It is quite possible that when the change-over from the first range to the second range occurs the rate of flow will already be in the third range. This situation would occur, for example, if the previously de-energized instrument were energized with the rate of flow already in the third range. At the change-over from the first range to the second range there would be no tendency for the shafts 154, 152 and 156 to turn backward. In this situation the change-over to the third range should be immediate, but because the switch 166 would not be opened following the first switch-over by retrograde movement of the shaft 156, the second switch-over could not occur.

In order to avoid this kind of failure, a relay winding 256 is provided in parallel with the coil of solenoid 190. The winding 256 pulls open the switch relay contacts 94 through which the signal current is transmitted. This interruption of signal current immediately unbalances potentiometer 110 and starts the shafts 152, 154 and 156 backward, opening the switch 166 and thereby cutting off current flow through the coil winding 256. This permits switch 94 to be re-closed, restoring the signal current at full strength. In consequence of the restored signal current the switch 166 is immediately re-closed and the shaft 188 is caused to be advanced another step to establish the third range conditions. The balancing motor will then find the position of balance, causing the flow rate to be correctly indicated on the third scale.

Similar provision is made for causing the instrument to pass substantially directly from the third scale to the first when conditions so require. In this instance the difficulty to be overcome is the fact that the switch 170 would tend to remain closed after switch-over from the third range to the second. A relay winding 258 is accordingly provided in parallel with the winding of solenoid 192. The winding 258 acts on switch 120 through which the steady voltage is applied to the upper end of the slide wire 124. The switch 120 is opened, the potentiometer 110 is unbalanced, and the shaft 156 is driven forward far enough to open the switch 170. This de-energizes winding 258, permits switch 120 to close, and reverses the direction of rotation of shaft 156, causing the switch 170 to be closed again. The second closing of the switch causes the change-over from the second range to the first range conditions. The balancing motor will then find the condition of balance, causing the flow rate to be correctly indicated on the first scale.

It is not generally desirable that the slide wire 124 be utilized for its full capacity in a given range, nor that the switch-over points be located at the extremities of the scales. In other words, the first and third range scales and sensors have capacity to extend over into overlapping relation to the lower and upper ends of the normal indicating range of the second sensor and scale, and the second range scale and sensor have the capacity to extend over into overlapping relation to the upper end of the normal indicating range of the first sensor and scale and into overlapping relation to the lower end of the normal indicating range of the third sensor and scale. This is important from the standpoint of avoiding any possible gap in the indications of flow rate and may be helpful in the testing of the calibration of the several ranges and in the re-calibration of the instrument.

For the purpose of calibration, 60 c.p.s. and 120 c.p.s. signals are made available from a conventional power line or from any other suitable source. At least one of these frequencies will usually lie within the actually used output range of each primary sensor. When one of these frequencies is supplied to the instrument under first range conditions it should produce a rate of flow reading on the first scale corresponding to the rate of flow which would cause the first sensor to produce that output frequency. The correct scale reading for sixty cycle and for 120 cycle sensor output is known, so that the correctness of the response can be readily ascertained and adjustment can be made if required. The same signal frequency or frequencies can also be supplied under the second and third range conditions, and the correctness of the resultant readings in the second and third ranges can be checked. Again adjustments may be made as required.

A switch 260 is shown in Figure 7 as making connection with conductor 74. In this position it transmits the signals from the several primary sensors and grounds out the (not shown) source of sixty cycle and 120 cycle signals.

When calibration or checking is desired, the switch 260 is shifted down into engagement with contact 73 of conductor 72. In this position the sixty cycle and 120 cycle signals are made selectively available and the primary sensors are grounded out.

For zero checking of the first range the switches 116 and 126 are closed with no signal being transmitted. When this check has been made, the switches 116 and 126 are re-opened, and the calibrate switch is swung to its lefthand position with 178 connected to 248 and 266 connected to 122. The closing of 178 on 248 assures that there will be no unintended shifting out of the first range. One or the other of the fixed signals is then transmitted, the reading noted, and adjustments made if required.

The second range is then similarly checked for zero with the switches 116 and 126 closed. This is done by operating the calibrate switch 262 to its right-hand or "advance" position to connect the switch member 178 with conductor 186. This is equivalent to closing of the switch 166, in that it sets up second range conditions. Second range conditions will, however, be maintained for as long as switch 178 remains connected to 186 because it will not be possible automatically to change ranges. With no signal transmitted the chart will be moved to its zero position. Upon the opening of switches 116 and 126 and the application of one of the fixed frequency signals, a predetermined reading on the second scale should result.

The third range is similarly checked. To put the instrument into the third range, the calibrate switch is just shifted to the right as already described to put the instrument into the second range. The calibrate switch is then drawn back momentarily to disengage 178 from 186 and then immediately moved rightward again to re-engage 178 with 186.

When the checking is complete, the instrument may be restored to the first range by shifting the calibrate switch to its left hand position to engage 178 with 246, reversing it momentarily and then re-engaging 178 with 246. Alternatively, switches 260 and 262 may be placed in their normal positions and switches 116 and 126 may be placed in their normal, open positions to restore the normal automatic operations.

The advance of the calibrate switch places switch number 264 in parallel with switch 94, so that opening of 94 by winding 256 will not affect the transmission of the signal. The reverse operation of the calibrate switch to "reset" position places the switch member 266 in parallel with switch 120, so that opening of 120 by winding 258 will not affect the application of reference voltage to the potentiometer slide wire 124.

While three ranges have been shown and described for illustrative purposes, it will be readily apparent that many more ranges could be provided. The Ledex mechanism actually illustrated can be readily adapted for a gradually increased number of ranges, while other mechanisms of the same general kind are available through which a still greater extension could be had.

I have described what I believe to be the best embodiment of my invention. I do not wish, however, to be confined to the embodiment shown, but what I desire to cover by Letters Patent is set forth in the appended claims.

I claim:

1. A plural range instrument for continually indicating a rate or condition throughout one after another of a succession of progressively higher ranges which jointly form a continuous, comprehensive field, comprising, in combination, stationary and movable indicator members which include a pointer and a dial, the latter having differently graduated scales provided upon it side by side for cooperating with the pointer, the scales reading in the same direction, and covering the respective ranges, primary sensor means responsive to the rate or condition to be measured and indicated, means constructed and arranged to be responsive to the sensor means for deriving from the sensor means D.C. signal voltages proportional to the condition or rate to be indicated, means for supplying a D.C. reference voltage of a predetermined magnitude which is independent of the magnitude of the signal voltage, a balancing potentiometer connected to the reference voltage supply means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, signal-control-resistors of appropriate set values arranged to be selectively included in circuit between the signal voltage deriving means and the potentiometer for selecting input signal ratios to the potentiometer which are to be effective throughout the respective ranges, separate electrical range indicator means for selectively indicating the scale to be referred to at any given time and circuit means including switching means constructed and arranged to be responsive to the balancing motor at an upper limit of each range other than the highest range, automatically to effectuate appropriate signal-control-resistor selection for the signal circuit throughout the next higher range, and automatically to effect activation of the range indicator required to be made effective throughout operation in such range, said circuit means also including switching means constructed and arranged to be responsive to the balancing motor at a lower limit of each range other than the lowest range, automatically to effectuate appropriate signal-control-resistor selection for the signal circuit throughout the next lower range, and automatically to effect activation of the range indicator required to be made effective throughout operation in such range.

2. A plural range instrument for continually indicating a rate or condition throughout one after another of a succession of progressively higher ranges which jointly form a continuous, comprehensive field, comprising, in combination, stationary and movable indicator members which include a pointer and a dial, the latter having differently graduated scales provided upon it side by side for cooperating with the pointer, the scales reading in the same direction, and covering the respective ranges, primary sensor means responsive to the rate or condition to be measured and indicated, means constructed and arranged to be responsive to the sensor means for deriving from the sensor means D.C. signal voltages proportional to the condition or rate to be indicated, means for supplying a D.C. reference voltage of a predetermined magnitude which is independent of the magnitude of the signal voltage, a balancing potentiometer connected to the reference voltage supply means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, reference voltage resistors of appropriate set values arranged to be selectively and optionally included in circuit between the reference voltage source and opposite ends of the potentiometer resistor for adjusting the voltages from said source which are to be maintained at opposite ends of the potentiometer resistor throughout the respective ranges, separate electrical range indicator means for selectively indicating the scale to be referred to at any given time, and circuit means including switching means constructed and arranged to be responsive to the balancing motor at an upper limit of each range other than the highest range, automatically to effectuate appropriate selection of the reference voltage resistors which are to be included in the reference voltage circuit throughout the next higher range, and automatically to effect activation of the range indicator required to be made effective in such range, said circuit means also including switching means constructed and arranged to be responsive to the balancing motor at a lower limit of each range other than the lowest range, automatically to effectuate appropriate selection of the reference voltage resistors which are to be included in the reference voltage circuit throughout the next lower range, and automatically to effect activation of the range indicator required to be made effective in such range.

3. A plural range instrument for continually indicating a rate or condition throughout one after another of a succession of progressively higher ranges which jointly form a continuous, compressive field, comprising, in combination stationary and movable indicator members which include a pointer and a dial, the latter having differently graduated scales provided upon it side by side for cooperating with the pointer, the scales reading in the same direction, and covering the respective ranges, primary sensor means responsive to the rate or condition to be measured and indicated, means constructed and arranged to be responsive to the sensor means for deriving from the sensor means D.C. signal voltages proportional to the condition or rate to be indicated, means for supplying a D.C. reference voltage of a predetermined magnitude which is independent of the magnitude of the signal voltage, a balancing potentiometer connected to the reference voltage supply means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, reference voltage resistors of appropriate set values arranged to be selectively and optionally included in circuit between the signal voltage deriving means and opposite ends of he potentiometer resistor for adjusting the voltages from said source which are to be maintained at opposite ends of the potentiometer resistor throughout the respective ranges, signal-control-resistors of appropriate set values arranged to be selectively included in circuit between the signal voltage deriving means and the potentiometer for selecting input signal ratios to the potentiometer which are to be effective throughout the respective ranges, separate electrical range indicator means for selectively indicating the scale to be referred to at any given time, and circuit means including switching means constructed and arranged to be responsive to the balancing motor at the upper limit of each range other than the highest range, automatically to effectuate appropriate signal-control-resistor selection for the signal circuit throughout the next higher range, automatically to effectuate appropriate selection of the reference voltage resistors which are to be included in the reference voltage circuit throughout the next higher range, and automatically to effect activation of the range indicator required to be made effective in such range, said circuit means also including switching means constructed and arranged to be responsive to the balancing motor at the lower limit of each range other than the lowest range, automatically to effectuate appropriate signal-control-resistor selection for the signal circuit throughout the next lower range, automatically to effectuate appropriate selection of the reference voltage resistors which are to be included in the reference voltage circuit throughout the next lower range, and automatically to effect activation of the range indicator required to be made effective in such range.

4. A plural range instrument for continually indicating a rate or condition throughout one after another of a succession of progressively higher ranges which jointly form a continuous, comprehensive field, comprising, in combination, stationary and movable indicator members which include a pointer and a dial, the latter having differently graduated scales provided upon it side by side for cooperating with the pointer, the scales reading in the same direction, and covering the respective ranges, a plurality of primary sensors responsive to the rate or condition to be measured and indicated, means constructed and arranged to be responsive to the sensors and to derive from each sensor D.C. signal voltages proportional to the condition or rate to be indicated, means for supplying a D.C. reference voltage of a predetermined magnitude which is independent of the magnitude of the signal voltage, a balancing potentiometer connected to the reference voltage supply means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, signal-control-resistors of appropriate set values arranged to be selectively included in circuit between the signal voltage deriving means and the potentiometer for selecting input signal ratios to the potentiometer which are to be effective throughout the respective ranges, separate electrical range indicator means for selectively indicating the scale to be referred to at any given time, and circuit means including switching means constructed and arranged to be responsive to the balancing motor at an upper limit of each range other than the highest range, automatically to effectuate appropriate signal-control-resistor selection for the signal circuit throughout the next higher range, automatically to effectuate appropriate selection of the primary sensor made effective in such range, and automatically to effect activation of the range indicator required to be made effective in such range, said circuit means also including switching means constructed and arranged to be responsive to the balancing motor at a lower limit of each range other than the lowest range, automatically to effectuate appropriate signal-control-resistor selection for the signal circuit throughout the next lower range, automatically to effectuate appropriate selection of the primary sensor made effective in such range, and automatically to effect activation of the range indicator required to be made effective in such range.

5. A plural range instrument for continually indicating a rate or condition throughout one after another of a succession of progressively higher ranges which jointly form a continuous, comprehensive field, comprising, in combination, stationary and movable indicator members which include a pointer and a dial, the latter having differently graduated scales provided upon it side by side for cooperating with the pointer, the scales reading in the same direction, and covering the respective ranges, a plurality of primary sensors responsive to the rate or condition to be measured and indicated, means constructed and arranged to be responsive to the sensors and to derive from each sensor D.C. signal voltages proportional to the condition or rate to be indicated, means for supplying a D.C. reference voltage of a predetermined magnitude which is independent of the magnitude of the signal voltage, a balancing potentiometer connected to the reference voltage supply means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, reference voltage resistors of appropriate set values arranged to be selectively and optionally included in circuit between the reference voltage source and opposite ends of the potentiometer resistor for adjusting the voltages from said source which are to be maintained at opposite ends of the potentiometer resistor throughout the respective ranges, separate electrical range indicator means for selectively indicating the scale to be referred to at any given time, and circuit means including switching means constructed and arranged to be responsive to the balancing motor at the upper limit of each range other than the highest range, automatically to effectuate appropriate selection of the reference voltage resistors which are to be included in the reference voltage circuit throughout the next higher range, automatically to effectuate appropriate selection of the primary sensor made effective in such range, and automatically to effect activation of the range indicator required to be made effective in such range, said circuit means also including switching means constructed and arranged to be responsive to the balancing motor at a lower limit of each range other than the lowest range, automatically to effectuate appropriate selection of the reference voltage resistors which are to be included in the reference voltage circuit throughout the next lower range, automatically to effectuate appropriate selection of the primary sensor made effective in such range, and automatically to effect activation of the range indicator required to be made effective in such range.

6. A plural range instrument for continually indicating a rate or condition throughout one after another of a succession of progressively higher ranges which jointly form a continuous, comprehensive field, comprising, in combination, stationary and movable indicator members which include a pointer and a dial, the latter having differently graduated scales provided upon it side by side for cooperating with the pointer, the scales reading in the same direction and covering the respective ranges, primary sensor means responsive to the rate or condition to be measured and indicated, means constructed and arranged to be responsive to the sensor means for deriving from the sensor means D.C. signal voltages proportional to the condition or rate to be indicated, means for supplying a D.C. reference voltage of a predetermined magnitude which is independent of the magnitude of the signal voltage, a balancing potentiometer connected to the reference voltage supplying means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, signal-control-resistors of appropriate set values arranged to be selectively included in circuit between the signal voltage deriving means and the potentiometer for selecting input signal ratios to the potentiometer which are to be effective throughout the respective ranges, separate electrical range indicator means for selectively indicating the scale to be referred to at any given time, a rotary control shaft, operating means for said shaft constructed and arranged to be responsive to the balancing motor at the upper limit of each range other than the highest to turn the control shaft forward a single step, switching means responsive to such turning automatically to effectuate appropriate signal-control-resistor selection for the signal circuit throughout the next higher range, and automatically to effect activation of the range indicator required to be made effective throughout operation in such range, such shaft operating means being also constructed and arranged to be responsive to the balancing motor at the lower limit of each range other than the lowest range to turn the control shaft backward a single step, the switching means being also responsive to such turning automatically to effectuate appropriate signal control resistor selection for the signal circuit throughout the next lower range, and automatically to effect activation of the range indicator required to be made effective throughout operation in such range.

7. A plural range instrument as set forth in claim 6 in which the shaft operating means automatically responsive to the balancing motor comprises solenoids for turning the control shaft forward and backward respectively, and solenoid energizing switches automatically closed at the upper and lower range limits, respectively, in response to operation of the balancing motor.

8. A plural range instrument as set forth in claim 6 in which the primary sensor means includes a plurality of primary sensors responsive in different degrees to the rate or condition to be measured and indicated, and in which the switching means responsive to the forward turning of the control shaft includes means automatically to effectuate appropriate selection of the primary sensor made effective in the next higher range, and the switching means responsive to the backward turning of the control shaft includes means automatically to effectuate appropriate selection of the primary sensor made effective in the next lower range.

9. A plural range instrument for continually indicating a rate or condition throughout one after another of a succession of progressively higher ranges which jointly form a continuous, comprehensive field, comprising, in combination, stationary and movable indicator members which include a pointer and a dial, the latter having differently graduated scales provided upon it side by side for cooperating with the pointer, the scales reading in the same direction, and covering the respective ranges, primary sensor means responsive to the rate or condition to be measured and indicated, means constructed and arranged to be responsive to the sensor means for deriving from the sensor means D.C. signal voltages proportional to the condition or rate to be indicated, means for supplying a D.C. reference voltage of a predetermined magnitude which is independent of the magnitude of the signal voltage, a balancing potentiometer connected to the reference voltage supplying means and to the signal voltage deriving means, in such manner that the reference and signal voltages are compared through the potentiometer, said potentiometer including a balancing motor electrically connected to operate in response to out of balance of the potentiometer and mechanically connected, through such operation to adjust the potentiometer in a direction to restore balance, means connecting the movable indicator member for operation by the balancing motor, signal-control-resistors of appropriate set values arranged to be selectively included in circuit between the signal voltage deriving means and the potentiometer for selecting input signal ratios to the potentiometer which are to be effective throughout the respective ranges, separate electrical range indicator means for selectively indicating the scale to be referred to at any given time, a rotary control shaft, operating means for said shaft comprising a solenoid and a solenoid energizing switch constructed and arranged to be responsive to the balancing motor at the upper limit of each range other than the highest range to turn the control shaft forward a single step, switching means responsive to such turning automatically to effectuate appropriate signal control resistor selection for the signal circuit throughout the next higher range, and automatically to effect activation of the range indicator required to be made effective throughout operation in such higher range, such shaft operating means also comprising a solenoid and a solenoid energizing switch constructed and arranged to be responsive to the balancing motor at the lower limit of each range other than the lowest range to turn the control shaft backward a single step, the switching means being also responsive to such turning automatically to effectuate appropriate signal control resistor selection for the signal circuit throughout the next lower range, and automatically to effect activation of the range indicator required to be made effective throughout operation in such lower range, said instrument further including provision for automatically reopening the switch of the solenoid that feeds the control shaft forward when a higher range is to be skipped, including a relay winding in parallel with such solenoid and energized concurrently therewith, and a switch in the supply line of the signal voltage constructed and arranged to be temporarily opened by the energization of the relay, and provision for automatically reopening the switch of the solenoid that feeds the control shaft backward when a lower range is to be skipped, including a relay winding in parallel with the latter solenoid and energized concurrently therewith, and a switch in the supply line of the reference voltage constructed and arranged to be temporarily opened by the energization of the latter relay.

References Cited in the file of this patent

UNITED STATES PATENTS

| | | |
|---|---|---|
| 1,934,948 | Perrine | Nov. 14, 1933 |
| 2,629,056 | Goodwin | Feb. 17, 1953 |
| 2,656,498 | Goodwin | Oct. 20, 1953 |
| 2,661,260 | Salzman | Dec. 1, 1953 |
| 2,874,354 | Bell | Feb. 17, 1959 |

FOREIGN PATENTS

| | | |
|---|---|---|
| 357,163 | Italy | Mar. 4, 1938 |